United States Patent [19]
Miller

[11] 4,410,557
[45] Oct. 18, 1983

[54] REARRANGED TRIGLYCERIDES AND PROCESS FOR MAKING SAME

[75] Inventor: Donald E. Miller, Strongsville, Ohio

[73] Assignee: SCM Corporation, New York, N.Y.

[21] Appl. No.: 332,670

[22] Filed: Dec. 21, 1981

[51] Int. Cl.[3] ........ A23D 5/00
[52] U.S. Cl. ........ 426/607
[58] Field of Search ........ 426/607

[56] References Cited

U.S. PATENT DOCUMENTS

| | | | |
|---|---|---|---|
| 2,309,949 | 2/1943 | Gooding | 260/411 |
| 2,442,536 | 6/1948 | Eckey | 99/118 |
| 2,726,158 | 12/1955 | Cochran et al. | 99/118 |
| 2,783,151 | 2/1957 | Cochran et al. | 99/118 |
| 2,859,119 | 11/1958 | Cochran et al. | 99/118 |
| 2,898,211 | 8/1959 | Barsky et al. | 99/118 |
| 2,972,541 | 2/1961 | Cochran et al. | 99/118 |
| 3,085,882 | 4/1963 | Gooding et al. | 99/118 |
| 3,796,581 | 3/1974 | Frommhold | 99/122 |
| 4,208,445 | 6/1980 | Cottier et al. | 426/607 |
| 4,214,012 | 7/1980 | Ainger et al. | 426/607 |
| 4,234,618 | 11/1980 | Jasko et al. | 426/607 |
| 4,268,534 | 5/1981 | Kawada et al. | 426/607 |

*Primary Examiner*—Robert A. Yoncoskie
*Attorney, Agent, or Firm*—Robert A. Sturges; Merton H. Douthitt

[57] ABSTRACT

A process, and product produced thereby, for making a normally solid triglyceride mixture of enhanced palatability and an SFI at 100° F. less than 20 from a blend of a normally liquid solvent derived fraction from a high lauric fat, e.g., palm kernel oil, and substantially free of any combined fatty acid portion having a trans configuration, and a stearine fraction derived from a selectively hydrogenated $C_{16}$–$C_{18}$ soybean and/or cottonseed oil having from about 20% to 50% of its combined fat forming acids in a trans configuration, and interesterifying or randomizing the blend.

10 Claims, No Drawings

REARRANGED TRIGLYCERIDES AND PROCESS FOR MAKING SAME

This invention relates to normally solid triglyceride compositions and a method for preparing them. More particularly, this invention is concerned with a fat or hard butter which is particularly useful in coatings, e.g., ice cream coatings, candies, and icings.

BACKGROUND OF THE INVENTION

Solvent fractionation of vegetable oils is not widely practiced domestically. This procedure involves diluting a refined vegetable oil with several volumes of any suitable solvent such as a low molecular weight aliphatic ketone, e.g., actone or methyl ethyl ketone, containing 3 or 4 carbon atoms up to 20 volumes and chilling the solution to a predetermined temperature, separating the resulting crystals from the mother liquor, washing, etc. The greater the extent of dilution with the solvent, the sharper the fraction. 2-Nitro-propane may also be used as a solvent in the same way. This process may be repeated at a different, usually lower temperature, to derive various fractions having particular utility, e.g., low fat spread confection coatings, etc. The final mother liquor derived from the oil by whatever fractionation procedure is used, is commonly designated an "olein" fraction. The first crystal fraction derived from the oil is higher melting and is commonly called a "stearine" fraction. The solvent fractionation procedure allows much sharper cuts of the oil than solventless "graining" and filtering wherein the filter cake retains a substantial percentage of the base oil.

In the case of palm kernel oil, an imported lauric oil, the "C", or olein fraction, or base stock derived by solvent fractionation is largely a lauric/myristic ($C_{12}$–$C_{14}$) normally liquid triglyceride. It is virtually unsaleable. In the cases of partially hydrogenated cottonseed, soybean or mixtures of these domestic oils, the stearine solvent fraction or hard stock ($C_{16}$–$C_{18}$) is also of limited commercial utility. Both fractions pose, therefore, a disposal problem whether used as fuel or otherwise disposed of. It has now been found that a useful normally solid triglyceride material or hard butter having desired properties such as described below can be produced from these commercially unattractive triglyceride by-products by blending them and catalytically rearranging or randomizing the blend.

Before proceeding to a more detailed description of my process and product, it is helpful to recognize the qualities and physical properties which characterize the broad class of materials known as "hard butter". One should appreciate at the outset that heretofore there have been few recognized or accepted specifications on the chemical constitution of "hard butters". Materials which have been bought and sold in the "hard butter" markets for many decades have been bought and sold primarily on the basis of physical properties, physical performance, odor, taste and other edible qualities. So long as a material met such qualifications, neither the buyer nor the seller needed to give much consideration to the chemical constitution of the material other than to be satisfied that it was a food product composed mainly of triglycerides. The principal physical properties considered in a "hard butter" are its softening point, melting point, fracture quality and freedom from sweating. Good "hard butters" should have a Wiley melting point between about 76° F. and 120° F., preferably 84° to 105° F. and should be hard and brittle at around normal room temperatures; that is, they should break sharply and suddenly at about 75° F., thereby having a brittle quality sometimes referred to as "snap". They should also be capable of standing at temperatures encountered in normal summer conditions without having liquid components thereof "sweat" or bleed out to the surface in the form of droplets or a visible liquid film. The Solid Fat Index at 100° F. should be less than 20, preferably less than about 7.

The physical performance qualities of "hard butter" are numerous. One desirable quality is freedom from a "waxy" feeing or taste in the mouth; waxiness by this test is related somewhat to a narrow or sharp melting range although not entirely determined thereby. The other performance qualities are gauged largely by the performance of standard chocolate coatings, of which one typical formula is: 33% hard butter, 20% cococa and 47% sugar, with usually 0.2% lecithin. Such a coating, when prepared from the "hard butter" being tested, should set or harden in a few minutes under the normal conditions encountered in the commercial practice of enrobing or otherwise applying the coating to a candy center or food product which is to be coated or iced. Thus, in enrobing a center with the coating, the coating should set in the few minutes which are allowed for the enrobed center to pass through a cooling tunnel maintained usually at temperatures of 50° F. or 60° F. When the piece emerges from the tunnel, the coating should be firm enough to permit it to be packaged directly. The liquid coating which is used for such purposes should also have a viscosity at about 110°–130° F. or at temperatures near the melting point of the fat suitable for making smooth, uniform coatings, and should have a moderately short drip time after being applied as a coating on a food product such as a candy center. Another important performance quality is that of "stand-up". After a food product has been coated or iced, the coating and the "hard butter" therein should resist any appreciable changes in character when exposed at normal summer temperatures or at the temperatures which are apt to be encountered in the transportation of the coated products. This test for the coating is somewhat analogous to the "sweat" test for the hard butter itself, but a different characteristic is watched for in the "stand-up" test. For the purposes of this test, the coating should not soften so much as to stick to stain or discolor the material in which the coated product is wrapped, and should not run from high points on the coated product to lower adjoining regions. Two other properties of coatings of the type represented by the foregoing typical formula which are tested to determine the quality of the "hard butter" in the coating are the hardness of the coating are measured by a penetration test at room temperature, and the gloss of the coating. A high gloss on the surface of the coating is desired, and it is further desired that the gloss be retained when the coating is allowed to stand at room temperature. Some hard butters are known to give a high initial gloss, but in the course of a day or two the coating becomes dull. Another way important performance quality or hard butter skin to "stand-up" is its ability to prevent, minimize or fail to induce "greying" and "bloom" when coatings containing cocoa are aged. Coatings which have turned grey, due frequently to the coated product having been heated and cooled alternately a number of times, are very unsightly and unappetizing, and customers generally refuse to buy the confection or return it to the seller on the misconception that it has become spoiled. A candy manufacturer is naturally very much opposed to the use of a "hard butter" which induces or will not prevent the "greying" of such coatings.

Miscellaneous qualifications of "hard butter" are freedom from odor, obtained by the conventional deodorizing treatments applied to fats and oils, and a bland taste, obtained by refining the "hard butter" to eliminate free fatty acids, soaps and other impurities almost completely. Free fatty acids may be tolerated in amounts of up to about 0.05%.

Such then are the qualities and properties which the "hard butter" trade expects of the materials which are offered as "hard butter". Nevertheless, the trade recognizes various grades of "hard butter", suitable for different end uses. While the different grades are not governed solely by Wiley melting points, yet for the present purposes of explaining my invention, I may classify them roughly into the following five groups having Wiley melting points around the following values:

| GRADE | Wiley Melting Point, °F. |
|---|---|
| 1 | 84 |
| 2 | 95 |
| 3 | 105 |
| 4 | 113 |
| 5 | 120 |

Hereafter and in the claims where the term "hard butter" is used without further qualification, it will be intended to designate a material corresponding to one of the grades listed above and otherwise meeting present trade requirements in respect to the properties and qualities described above.

PRIOR ART

Randomizing, rearrangement, or interesterification (all equivalent terms as used herein) of triglyceride oils by catalytic means is well known. Cochran et al, for example, U.S. Pat. No. 2,726,158 have disclosed a hard butter formed by mixing one or more imported refined, optionally hydrogenated, vegetable oils such as coconut oil or palm kernel oil with one or more refined, optionally hydrogenated domestic vegetable oils, e.g., soybean, or cottonseed oil, and then catalytically rearranging the blend. Cochran et al disclosed that when the iodine value is below about 20, the rearranged product exhibits the characteristics of a hard butter if the distribution of kinds and amounts of fatty acids corresponding to the fatty acid radicals contained in the triglycerides of the product are within certain prescribed limits. In U.S. Pat. No. 2,783,151 Cochran et al. found that after the rearrangement is completed the content of $C_6$–$C_{10}$ fatty acid radicals can be lowered to any desired value by replacement with higher fatty acids to bring the final fat within the desired hard butter range. Iodine values up to 20 can be tolerated when such iodine value represents unstaturation confined to fatty acid radicals having an even number of carbon atoms greater than 12 acid radicals. In this U.S. Pat. No. 2,783,151, a domestic oil stearine (10%) with coconut oil is rearranged by sodium methoxide catalyst. Thereafter stearic acid is added and the mass heated to 525° F. to 550° F. for several hours. A useful hard butter is obtained after removal of the free fatty acids, refining, bleaching and deodorizing.

A third patent to Cochran et al, U.S. Pat. No. 2,859,119 discloses the rearrangement of a blend of at least one nonlauric oil with at least one lauric oil. The "hardstocks" used according to the inventors are hydrogenated vegetable oils (I.V.<10) e.g., cottonseed, soybean, rapeseed and corn oil. The stearine fraction of grained oils, particularly if hydrogenated, may also in some cases be used as the hardstock. As the basestock, or lauric oil, there may be used an oil of the coconut group, e.g., coconut, palm kernel, babassu, tucum, murumuru oil or mixtures of such oils, individual fractions of oils of the coconut group and mixtures of such fractions with each other or with one or more of such oils. Fractions of the oils can be those prepared in any manner as by "graining", by subjecting an oil, or mixture of oils, to fractional distillation, or by combinations of these and other treatments. The nonlauric and lauric oils are blended and rearranged in the usual manner. The products are primarily shortenings and are unlike hard butters in that they lack the sharp fracture quality (snap) and have a melting range wider than that of hard butters, but narrower than that of a nonlauric oil.

Barsky et al U.S. Pat. No. 2,898,211 produce a hard butter by contacting a suitable oil having the desired saturation-unsaturation balance and the proper molecular orientation with a solvent such as acetone, under conditions to cause crystallization of the high melting fraction. The remainder is subjected to a second set of conditions whereby the bulk of the mixed glycerides is crystallized out leaving the di- and tri-unsaturates in solution. The precipitated high melting fraction (A) and the liquid fraction (C) are then mixed and rearranged to give another supply of mixed glycerides which can be used as a starting material either alone or with additional oil and treated to first crystallize fraction A and then fraction B which is the hard butter.

Cochran et al U.S. Pat. No. 2,972,541 teach the preparation of hard butters by selective hydrogenation to convert unsaturated $C_{18}$ fatty acid radicals of the oils from the cis configuration to the trans configuration. The recovered hard butter should have a predetermined relationship among saturated fatty acids, cis-monoethanoic acids and trans-monoethanoic acids. The hard butter is solvent fractionated.

Gooding et al U.S. Pat. No. 3,085,882 produce a hard butter by reacting a lauric-type fat with a hardened $C_{18}$-type fat to produce an ester-interchanged fat having an iodine value less than 15. The ester-interchanged fat is blended with a selectively hydrogenated $C_{18}$-type fat having an I.V. of no less than about 60. It is contemplated that a separate fraction of the lauric type fat may be reacted with the $C_{18}$-type fat and the reaction product blended with a $C_{18}$-type fat to yield a hard butter.

Reference may also be had to Frommhold U.S. Pat. No. 3,796,581, Jasko et al U.S. Pat. No. 4,234,618 and Kawada et al U.S. Pat. No. 4,268,534 for teachings of other lipoidal compositions utilizing various fats and fat fractions interesterified to give butters.

None of the prior art suggests blending solvent derived fractions including an olein fraction of a lauric oil and a stearine fraction of a domestic oil or mixture of domestic oils, and rearranging the blend to yield a hard butter product.

BRIEF STATEMENT OF THE INVENTION

Briefly stated, therefore, the present invention is in a rearranged blend of a solvent derived olein fraction of a lauric oil, such as palm kernel oil, and a solvent derived stearine fraction of selectively hydrogenated domestic vegetable oil or mixture of domestic vegetable oils, e.g., safflower, sunflower, peanut, corn, soybean, cottonseed, mixtures thereof and particularly mixed soybean/cottonseed oil. The fat fractions are blended in a weight proportion of from 20:80 to 80:20. The olein fraction is normally liquid and is characterized in that it is composed principally of $C_{12}$ or $C_{14}$ fatty acid triglycerides and substantially free of fat forming acids having a trans configuration. The stearine fraction is normally solid and is characterized in that it is composed principally of $C_{16}$ or $C_{18}$ fatty acid triglycerides having from about 20–50% of its combined unsaturated fat forming acids in a trans configuration. The rearranged blend has the desired properties of a hard butter for use in ice cream coatings, confections, coffee whiteners, frozen deserts, whipped toppings, margarine, and like products, i.e., an SFI at 100° F. less than about 7. The manner of using such hard butters is well known as illustrated by the references cited above.

DETAILED DESCRIPTION OF THE INVENTION

As indicated above, a principal advantage of the present invention is that it enables the utilization of two solvent derived fat fractions which individually have little if any commercial value. The products of this invention are also useful substitutes for similar products based on imported oils such as coconut, palm, palm kernel, etc., with which the present products may compete favorably in terms of price as well as performance. Moreover, in these products, a more expensive component (the solvent derived olein fraction of the imported oil) is diluted with a less expensive solvent derived stearine fraction from a selectively hydrogenated domestic vegetable oil or oil mixture. For economic reasons, soybean and cottonseed oils are preferred. When used as a mixture, the oil blend may range from about 10:90 to about 90:10 on a weight basis of soybean and cottonseed, respectively.

The preferred imported oil is palm kernel oil which is rich in $C_{12}$–$C_{14}$ fats. Other lauric oils may be solvent fractionated to provide a basestock useful therein such as any of those mentioned above as disclosed in Cochran et al, U.S. Pat. No. 2,859,119. In general, the lauric oils should have a high lauric content, i.e., from about 40% to about 55% lauric content and from about 65% to about 88% combined lauric and myristic as determined by gas-liquid chromatography and expressed as fatty acids. In contrast to the selectively hydrogenated domestic oils, the lauric oils useful herein, which are not hydrogenated have little or no acids of trans configuration.

The crude oil is refined before use by known procedures, e.g., alkali refining with dilute NaOH solution and bleached or decolorized also by known procedures, e.g., with clay. The refined oil is then diluted in a suitable solvent such as acetone, 2-nitro propane, methyl ethyl ketone, or the like. Reference may be had to U.S. Pat. No. 4,234,618, column 5, and to U.S.Pat. No. 2,972,541 for teachings of fractional solvent crystallization as it may be practiced in this invention to solvent derive both the olein fraction from palm kernel oil and the stearine fraction from the selectively hydrogenated domestic oil or oils. The stearine fraction is precipitated by chilling a solvent solution of fat. The olein fraction is the mother liquor stripped of solvent from successive partial crystallizations. From equal volumes of solvent and fat up to 20 volumes of solvent per volume of fat may be used, the higher dilutions favoring more precise fractionation. In this example, from 3 to 8 volumes of solvent (acetone) to 1 of fat are used. The solution is then cooled in a scraped wall chiller to about 30° F. and the precipitated fraction filtered off. A second crystal crop may be taken. The oil fraction or "olein" fraction is the starting material for the present invention. The solvent is removed from the oil and recovered for reuse. This fraction is then bleached and deodorized, and used in the present process.

The preferred domestic oil is a 50:50 mixture of soybean and cottonseed oils. Other domestic oils or mixtures of such oils such as mentioned above may be used as a source of the "hardstock" or stearine solvent derived fraction. These oils are refined in the usual manner either individually, after which they may be blended, or collectively as a blend. The oil is then selectively hydrogenated or elaidenized by known procedures (See U.S. Pat. No. 2,972,541, column 6, Example 3), using a nickel catalyst, to an iodine value of 50–70, preferably about 60. The domestic oils when so selectively hydrogenated or elaidenized will have from 20% to 50% of its combined fat forming acids in a trans configuration. The catalyst is filtered off and the oil diluted with acetone as exemplified with the palm kernel oil above described. Generally, the dilution may range from 1:1 (solvent:oil) to 20:1. Preferably the ratio is in the range of from 3:1 to 8:1, and specifically 5:1. The solution is then introduced into a scraped wall chiller, and chilled to from 58° to 61° F. The solid crystalline material is recovered by filtration and washing and used herein as the hardstock or stearine fraction. This solvent derived "$GS_3$" (See Example 3 of U.S. Pat. No. 2,972,541) stearine fraction is the fraction which has only limited commercial value as such, but is utilized herein.

In each of the cases of palm kernel oil and the domestic oil, the commercially valuable products are contained in the fractions not utilized in the present invention.

Typical solvent derived fat fractions useful in forming hard butters of the present invention have the following characteristics:

TABLE I

Typical Physical-Chemical Properties of palm kernel C (PKC) fraction and domestic oil stearine (KLX) A fraction.

| Fatty Acid Carbon Content; Unsaturated | PKC % | KLX % |
|---|---|---|
| 6:0 | 0.5 | — |
| 8:0 | 6.4 | 0.1 |
| 10:0 | 4.3 | 0.1 |
| 12:0 | 42.1 | 0.2 |
| 14:0 | 10.8 | 0.6 |
| 16:0 | 7.4 | 17.4 |
| 16:1 | — | 0.3 |
| 18:0 | 1.9 | 31.7 |
| 18:1 | 22.3 | 48.2 |
| 18:2 | 4.3 | 1.0 |
| 20:0 | — | 0.4 |
| Calculated Iodine Value | 26.6 | 43.4 |
| Drop Point 1° C./Min. | 69.6° F. | 127.2° F. |
| % Trans acids | — | 31.6 |
| S.F.I.* at 50° F. | 59.0 | 77.8 |
| 70° F. | 0.0 | 77.5 |
| 80° F. | — | 77.7 |
| 92° F. | — | 72.1 |
| 100° F. | — | 60.9 |
| 110° F. | — | 41.3 |

*SFI = Solid Fat Index

In the foregoing example, the %'s of the various acids will vary from source to source as well as batch to batch from the same source. The "trans" acid content will vary from 20% to 50% of the combined fat forming acids not only for the above reasons, but also as a result of the kind and extent of elaidenization.

Table II below shows the properties at typical physical blends of PKC and KLX fractions prior to rearrangement.

TABLE II

ANALYTICAL DATA FOR PHYSICAL AND REARRANGED BLENDS OF KLX AND PKC

| | | PHYSICAL BLENDS | | | | | | | | | | |
|---|---|---|---|---|---|---|---|---|---|---|---|---|
| PKC (%) | 100 | 80 | 75 | 67.5 | 55 | 55 | 50 | 45 | 40 | 30 | 25 | |
| KLX (%) | | 20 | 25 | 32.5 | 40 | 45 | 50 | 55 | 60 | 70 | 75 | 100 |
| SFI @ | | | | | | | | | | | | |
| 50° F. | | 35.2 | 36.3 | 41.3 | 45.3 | 48.3 | 52.0 | 52.8 | 56.1 | 63.7 | 66.3 | 77.0 |
| 70° F. | | 11.4 | 16.7 | 22.9 | 29.4 | 33.7 | 38.7 | 41.5 | 46.1 | 56.5 | 60.9 | 77.0 |
| 80° F. | | 10.0 | 14.6 | 21.2 | 27.7 | 31.9 | 37.1 | 40.3 | 44.9 | 55.6 | 60.9 | 77.0 |
| 92° F. | | 6.6 | 10.2 | 15.8 | 21.4 | 25.6 | 30.4 | 33.5 | 38.2 | 48.5 | 53.2 | 72.0 |
| 100° F. | | 3.6 | 7.1 | 11.8 | 16.1 | 19.6 | 23.7 | 26.9 | 30.9 | 41.2 | 45.9 | 60.0 |
| 110° F. | | 0.6 | 1.7 | 4.5 | 7.6 | 9.8 | 12.8 | 15.1 | 18.0 | 23.8 | 27.5 | 40.0 |
| D.P. 1° C./Min. | | 37.3 | 41.7 | 43.8 | 45.8 | 46.6 | 47.4 | 48.3 | 49.1 | 50.6 | 51.1 | 52.0 |

Rearrangement of glycerides by means of catalysts is, of course, well known to those skilled in the art, and the treatment is generally understood to involve exposiing the desired reaction mixture in the liquid phase to a small amount of effective catalyst(s) under favorable reaction conditions at temperatures up to about 250° F. The catalyst should be a low-temperature rearrangement catalyst such as an alkali metal alkoxide having up to 4 carbon atoms, an alkali metal hydride such as sodium hydride, or one or more of various other catalyst such as are described in the Eckey U.S. Pat. No. 2,442,536. Similar alkaline compounds such as lithium aluminum hydride and calcium hydride have been found by us to be ineffective, as have such known catalytic materials as aluminum isopropylate. We are aware of the Gooding U.S. Pat. No. 2,309,949 in which a variety of alkaline reacting compounds are employed in a combination with hydroxyl carrying materials, but such catalysts and/or the high reaction temperatures involved in their use are here avoided.

Small amounts of one or more of the low temperature rearrangement catalysts are employed in the treatment. As little as 0.02% of sodium methoxide by weight on the mixture of glycerides is effective when conditions are such that the methoxide is in an active condition. Most of the effective catalysts induce an exothermic reaction, and such exothermicity becomes increasingly difficult to work with as the amount of catalyst is increased. Moreover, losses of glycerides tend to be increased and more saponification tends to occur. For these reasons we avoid the use of more than about 1% of catalyst. We prefer to use between about 0.1% and 0.5% of such active catalysts as sodium methoxide, sodium ethoxide or sodium hydride, and prefer a formula-equivalent percentage of other active low-temperature catalysts.

The catalyst is easily destroyed or inactived by water, moisture, carbon dioxide and air. Accordingly, in order to provide treating conditions which are favorable to activity on the part of the catalyst, the mixture of triglycerides should be thoroughly dry, and contact with the moisture and carbon dioxide of the air must be effectively prevented. We have found that an inert atmosphere such as provided by hydrogen, nitrogen or vacuum is very effective. When an inert gaseous atmosphere of dry hydrogen or nitrogen is maintained over mixture of glycerides, the treatment can be effectively carried out in a loosely-covered container. Preferably, however, the treatment is conducted in a vacuum chamber since by heating the mass to expeditious reaction temperatures in a vacuum of around 0.1 to 0.2 inch of mercury or lower, the glycerides can be dried effectively. Nitrogen can then be introduced for agitation and blanketing purposes to reduce the vacuum to about 1.5 inches' gauge pressure. Mechanical agitation can also be used. The container may be of iron, stainless steel or glass, but other unreactive materials can also be used.

The catalyst is also destroyed by free acids and by peroxides. Accordingly, the glycerides which are to be treated should have been refined in advance with alkalis or otherwise to reduce the free fatty acid content to about 0.05% or lower, and to eliminate peroxides as far as possible. It should be understood that the provision of refined triglycerides and of other conditions favorable to the catalyst is done mainly in the interest of economizing in the amount of catalyst and to lower refining losses in the finished material. The consequence of not making such provisions is simply that the quantity of catalyst which must be introduced to overcome all such unfavorable factors is wasted.

As indicated above, the temperature of the catalytic treatment can be varied over an appreciable range. When solvents are employed, temperatures as low as room temperature have been employed successfully. When the treatment is conducted in the presence or absence of solvents, the temperature should at least be high enough to maintain the mass in homogeneous liquid phase throughout the catalyst treatment. In the absence of solvents, the minimum temperature will, of course, depend on the particular mixture of triglycerides which is being treated. Temperatures as high as 250° F. have been used successfully in vacuum equipment in the absence of solvents, but we prefer to use temperatures around 200°-240° F. in such vacuum equipment as they lead to low losses of material and to the formation of but little soap. Temperatures above about 250° F. are avoided because of catalyst decomposition and because of the exothermicity of the reaction and the disadvantageous results attendant thereon, as mentioned above.

The effectiveness of the catalyst and of the treatment can be determined by the changed physical properties of the mass, but it has also been found that it is easily determined by the color of the mass of glycerides. The color of the mass changes from its original color to a reddish-brown color when the rearrangement reactions have been completed. If no such color change is observed within a few minutes after the catalyst has been added, it signifies that something has deactivated the catalyst. Frequently the initial addition of the catalyst almost cures the difficulty, and the rearrangement and color change will be found to occur promptly on the further addition of a small quantity of catalyst. Likewise, when only a slight color change is observed, it may signify that the catalyst was initially active but was soon inactivated. A further addition of catalyst will then cause the reaction to go to completion. It has been observed that the rearrangement reaction goes to completion in a period of a few minutes if sufficient active catalyst is present. The addition of more catalyst under such conditions produces no further change, nor does holding the mass for a prolonged period of time.

After the catalytically induced rearrangement reaction has been completed, the mass can be cooled sufficiently to permit it to be washed with water or dilute acids so as to decompose the catalyst. Such washing is preferably done at temperatures around 170°-180° F. since there is little tendency at such temperatures for an emulsion to be formed. The washed material can then be stratified and the water separated from the mass of treated oil. The oil can then be dried by applying vacuum with or without further heating. The drying operation can, of course, be effected in any of the other ways well known to those skilled in the art.

After the mass of glycerides has been treated to effect rearrangement, and then has been washed, it is next bleached and then deodorized. The bleaching and deodorizing treatments can be any of the conventional ones, and need no extended description here.

84° to 120° F. The 80 PKC:20 KLX rearranged product is currently less costly to produce as an ice cream coating than a hard butter produced from imported coconut oil.

What is claimed is:

1. A process for making a hard butter of enhanced palatability, having a Wiley Melting Point in the range of 84° to 120° F., and an SFI at 100° F. less than 7 comprising blending first and second solvent derived fat fractions in a weight proportion of 20:80 to 80:20, and rearranging said blend, said first fat fraction being a normally liquid lauric residual fraction from a predominantly $C_{12}/C_{14}$ high lauric content edible oil substantially free of combined fat-forming acids in a trans configuration, having a lauric content of about 40-55% and a combined lauric and myristic content of about 65-88%, and said second fat fraction being a stearine fraction from an edible selectively hydrogenated and elaidenized preponderantly $C_{16}/C_{18}$ edible vegetable fat having from about 20-50% of its combined fat forming acids in a trans configuration, said vegetable fat being soybean oil derived, cottonseed oil derived, or blend thereof, hydrogenated to an IV of about 50-70.

2. A process as defined in claim 1 wherein the high lauric content edible oil is palm kernel oil.

3. A process as defined in claim 1 wherein the mixture of domestic vegetable oils is a mixture of soybean oil and cottonseed oil in a weight ratio of from 10:90 to 90:10, respectively.

4. A process as defined in claim 3 wherein the weight ratio of soybean and cottonseed oils is 50:50, respectively.

TABLE III

ANALYTICAL DATA FOR PHYSICAL AND REARRANGED BLENDS OF KLX AND PKC

| | | REARRANGED BLENDS | | | | | | | | | | |
|---|---|---|---|---|---|---|---|---|---|---|---|---|
| PKC (%) | 100 | 80 | 75 | 67.5 | 60 | 55 | 50 | 40 | 40 | 30 | 25 | |
| KLX (%) | | 20 | 25 | 32.5 | 40 | 45 | 50 | 55 | 60 | 70 | 75 | 100 |
| SFI @ | | | | | | | | | | | | |
| 50° F. | | 37.1 | 39.3 | 40.9 | 44.9 | 46.9 | 49.6 | 51.5 | 54.6 | 60.1 | 62.7 | |
| 70° F. | | 14.4 | 17.9 | 20.0 | 25.0 | 28.2 | 30.8 | 34.9 | 39.3 | 48.7 | 53.5 | |
| 80° F. | | 2.8 | 5.6 | 8.9 | 14.6 | 17.9 | 21.9 | 26.3 | 31.7 | 43.1 | 48.8 | |
| 92° F. | | — | — | — | 1.7 | 3.4 | 6.2 | 9.9 | 14.2 | 25.3 | 31.9 | |
| 100° F. | | — | — | — | — | — | 1.1 | 2.7 | 5.7 | 13.9 | 19.3 | |
| 110° F. | | — | — | — | — | — | — | — | — | 1.6 | 4.2 | |
| D.P. 1° C./Min. | | 26.9 | 28.9 | 31.1 | 29.3 | 29.9 | 36.1 | 37.5 | 38.8 | 42.7 | 44.1 | |

It will be observed from the foregoing Table III that the change in SFI and melting characteristics brought about by interesterifying or randomizing or rearranging the various blends is quite remarkable. It is believed that the remarkable properties are due at least in part to the nature of the fractionation procedure used. Relatively noncommercial by-products from solvent fractionated palm kernel oil (olein or "C" fraction) and the stearine fraction from solvent fractionated partially or selectively hydrogenated cottonseed oil, or partially hydrogenated soybean oil or mixed cottonseed/soybean oils may thus be utilized to provide a useful hard butter product competitive with that derived from imported lauric oils. The products of this invention do not appear readily subject to hydrolysis of the lower molecular weight fatty acids and development of a "soapy" taste for which some hard butters have been criticized. These products have a Wiley Melting Point within the range 5. A process as defined in claim 1 wherein the first solvent derived fat fraction is the olein fraction derived from palm kernel oil using a low molecular weight aliphatic ketone containing 3 to 4 carbon atoms as the solvent.

6. A process as defined in claim 5 wherein the ketone is acetone.

7. A process as defined in claim 5 wherein the second solvent derived fat fraction is the stearine fraction derived from selectively hydrogenated mixed soybean/cottonseed oils using a low molecular weight aliphatic ketone containing 3 or 4 carbon atoms as the solvent.

8. A process as defined in claim 7 wherein the ketone is acetone.

9. A product produced in accordance with the process of claim 1.

10. A product produced in accordance with claim 8.

* * * * *